June 19, 1956

S. G. BRADY 2,750,718

METHOD AND APPARATUS FOR GRINDING INNER
SIDE FACES OF CHANNEL MEMBERS

Filed Dec. 14, 1953

INVENTOR.
SAMUEL G. BRADY
BY
*Whittemore Hulbert Belknap*
ATTORNEYS

June 19, 1956   S. G. BRADY   2,750,718
METHOD AND APPARATUS FOR GRINDING INNER
SIDE FACES OF CHANNEL MEMBERS
Filed Dec. 14, 1953   2 Sheets-Sheet 2

*INVENTOR.*
SAMUEL G. BRADY
BY
*Whittemore Hulbert & Belknap*
ATTORNEYS

United States Patent Office 2,750,718
Patented June 19, 1956

2,750,718

METHOD AND APPARATUS FOR GRINDING INNER SIDE FACES OF CHANNEL MEMBERS

Samuel G. Brady, Royal Oak, Mich., assignor to The Gear Grinding Machine Company, Detroit, Mich., a corporation of Delaware Application December 14, 1953, Serial No. 397,862

2 Claims. (Cl. 51—281)

The invention relates to the grinding of inner surfaces of channel members and more particularly to the grinding of the inner faces of opposite sides thereof. One method by which such grinding has heretofore been accomplished is to use a disk grinder wheel of a width less than the width of the channel to permit of insertion therein and then grinding the inner faces by the opposite side faces of said wheel. Such method necessitates the periodic retrimming of the sides of the wheel which in time becomes too thin for further use and must be replaced by another grinder disk.

It is the object of my invention to obtain a method and apparatus by which the peripheral face of the grinder wheel may be used to grind said inner side surfaces of said channel members and to this end the invention consists in the method and apparatus as hereinafter set forth.

My improved method and apparatus are capable of use in grinding various constructions of channel members but I shall illustrate and describe only one specific construction. A is a channel member of substantially U-shaped cross section and which, as shown, has a round shank B extending from one end thereof. C diagrammatically illustrates a rotary carrier having a plurality of work holders distributed thereabout. As specifically shown the carrier C includes a rotary hexagonal member D and three work holders are mounted on equi-spaced faces of this member. Each work holder includes a block E having a V-shaped groove E' therein, which block is secured to one of the faces of the member D and is positioned to receive the shank B of the channel member A. The axis of the shank is slightly oblique to the longitudinal axis of the channel member and, therefore, the block E is at a corresponding angle so as to arrange the channel parallel with the axis of the carrier C. Also, as shown, two work members are mounted with their channel portions adjacent to each other and in alignment, while the shank portions extend oppositely and engage similar blocks E. Each shank B is clamped in the V-shaped grooves by an L-shaped rock arm F which is operated by the piston rod G of a hydraulic cylinder and piston motor H, said rod being connected by a pivotal link I to the arm F. The motor H is mounted on a face of the hexagonal member adjacent to that on which the block E is mounted. The work holder is further provided with means for clamping the channel portions A. Such means includes bifurcated clamping arms J provided with inwardly projecting pins J' which engage apertures A' in the opposite sides of each channel member. The arms J are slidably mounted on guide rods K and are actuated by a hydraulic motor. This includes a cylinder L with pistons therein connected by the piston rods L' to the arms J. It will be understood that this specific clamping means is only used with channel members having the apertures A' in the side walls thereof and the construction must be modified for clamping channel members not provided with such apertures.

Figure 1:
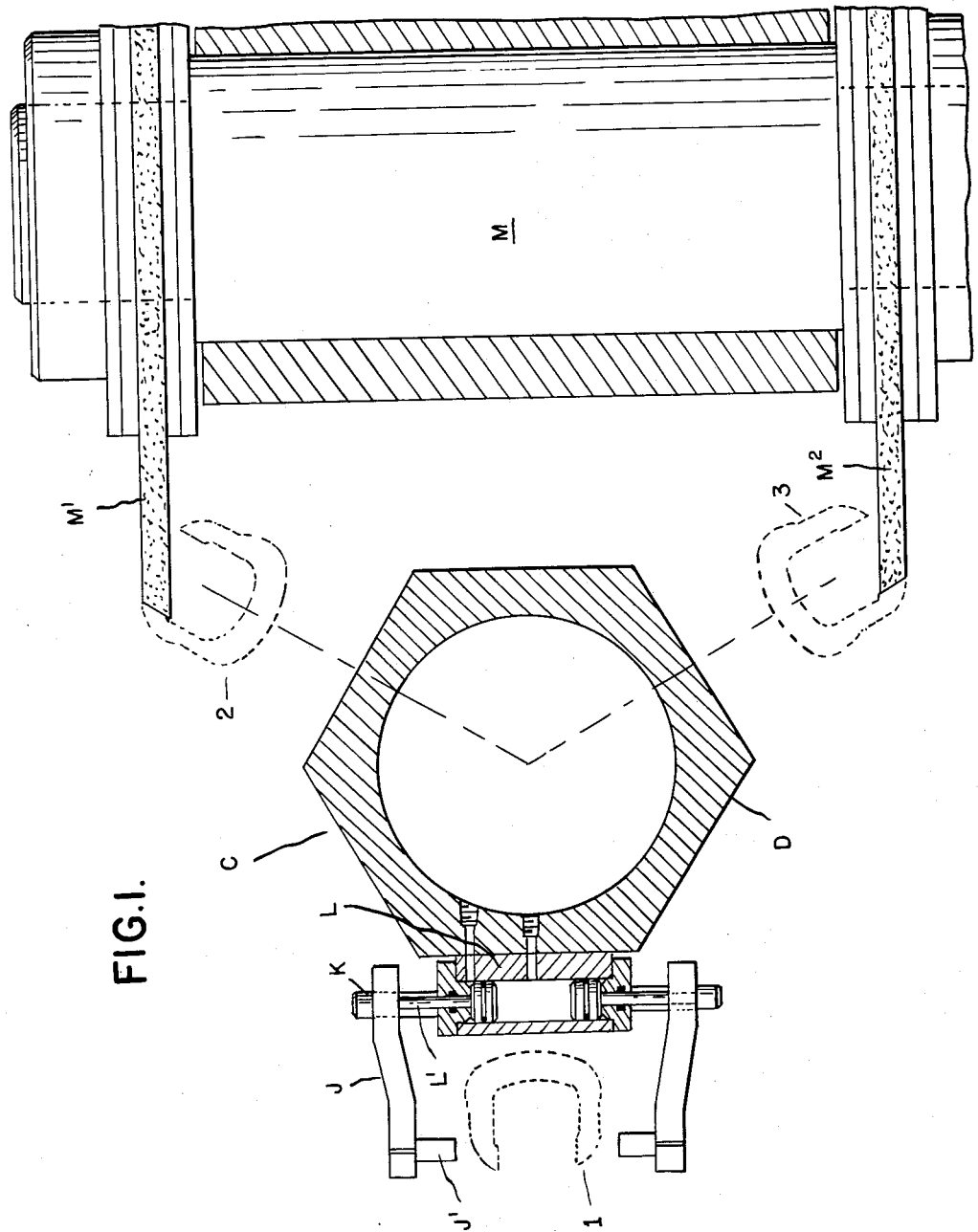
Fig. 1 is a diagrammatic elevation of an apparatus for carrying out my improved method.
Figure 2:
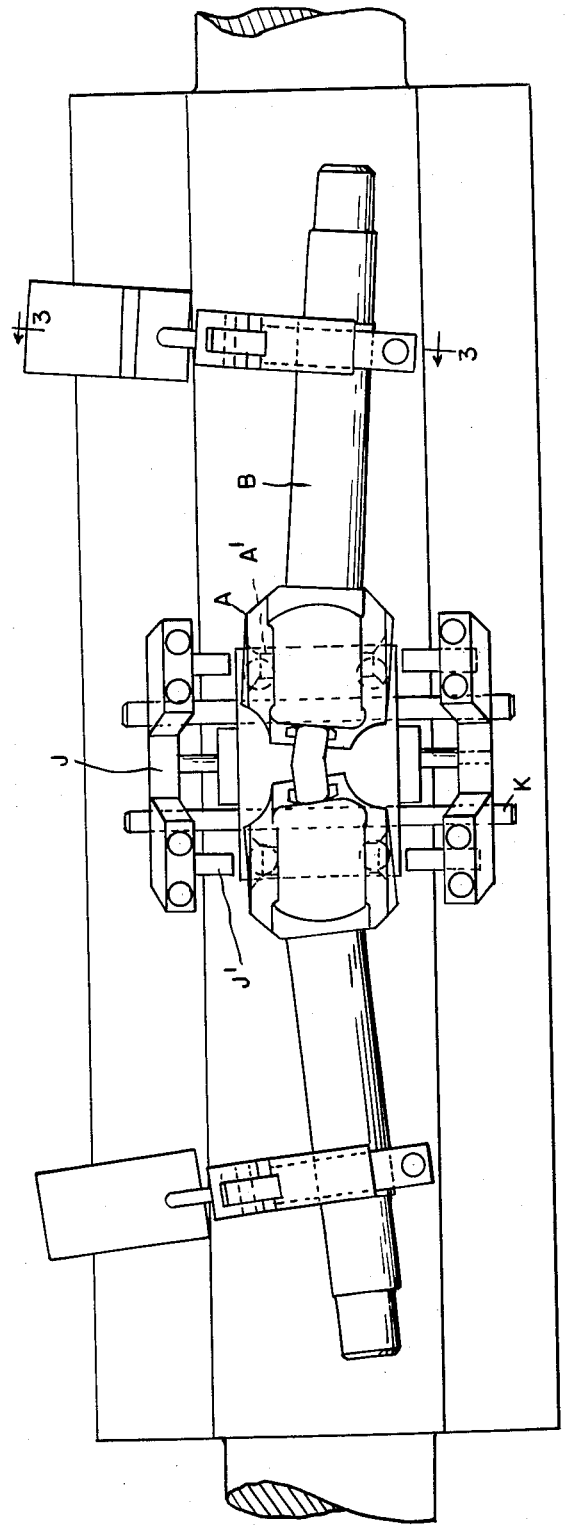
Fig. 2 is a front elevation thereof showing one of the work holders.
Figure 3:
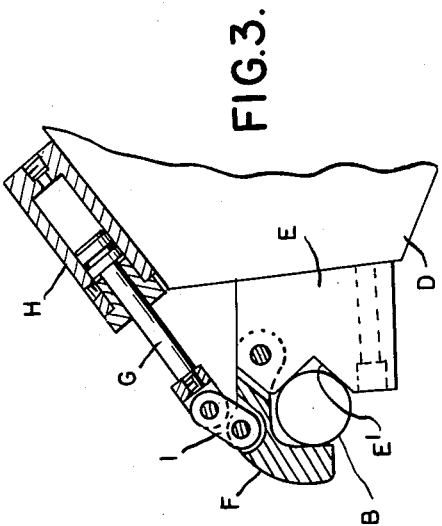
Fig. 3 is a cross section on line 3—3, Fig. 2.

The carrier C is mounted in relation to a grinding wheel arbor M which is at one side thereof and with its axis transverse to the axis of the carrier. Mounted on this arbor are two disk grinder wheels M' and M² which are so positioned as to be in operative relation to the work in two indexed positions of the work holders n said carrier. The indexing means for the carrier is not illustrated but as shown in Fig. 1, 2 and 3 are the indexed positions of the holders in the cycle. Position 1 is opposite the side of the carrier to that on which the grinding arbor is placed. In positons 2 and 3 the channel portions of the work will be arranged at opposite oblique angles to the planes of the grinder wheels, each being at an angle of 120° to said plane. Consequently the grinder wheels will extend into the opening of the channel clearing the outer end of one side thereof and peripherally contacting with the inner face of the opposite side. This peripheral face is trimmed to extend at the same oblique angle to the plane of rotation so that it will be tangent to the inner face of the channel side with which it is in contact. If the carrier with the work thereon is then reciprocated axially the grinder wheels will travel the length of the two channel members A and grind the inner faces of the sides thereof. One face of each channel will be ground by the wheel M' and the other by the wheel M². It will be understood that the machine will be provided with a trimming mechanism for each of the grinder wheels but as this forms no part of the instant application it will not be described. It is also unnecessary to describe the specific construction of grinding machine on which the work carrier and grinder wheels are mounted as this only requires a means for moving the carrier axially thereof and periodically indexing to advance the work holders through the positions 1, 2 and 3.

With the specific channel members illustrated the ground surfaces are only at the outer ends of the side members and, therefore, an angle of 120° between the plane of the channel and the plane of rotation of the grinder wheels will give sufficient clearance. If, however, the ground surface is of greater depth in the channel it may be necessary to change the angle so that the periphery of the grinder will extend to this depth without interference with the opposite side of the channel.

What I claim as my invention is:

1. The method of grinding inner faces of channel members comprising rotating spaced disk grinder wheels about a common axis, intermittently advancing the channel members step by step through an orbit having stations in operative relation to the respective grinder wheels, the portion of said orbit of said stations being at opposite oblique angles to a plane which is perpendicular to the axis of rotation of said grinder wheels and with their openings outward for the entrance therein of the respective grinder wheels and with the peripheral surfaces thereof in grinding contact with opposite inner side faces of the channel, relatively moving said grinder wheels and stations longitudinally of the channels to effect the grinding of said inner faces, the cross sectional peripheral contour of said grinder wheels being at opposite oblique angles to their plane of rotation such that the sum of said angles and said angle of turning of said orbit between stations produces a predetermined angular relation to each other of the ground inner faces.

2. The method as in claim 1 in which a series of channel members is simultaneously advanced through said orbit with two members thereof in registration with the respective grinder wheels to simultaneously grind opposite inner faces thereof.

References Cited in the file of this patent

UNITED STATES PATENTS

| | | |
|---|---|---|
| 946,153 | Phelps | Jan. 11, 1910 |
| 1,150,535 | Reinecker | Aug. 17, 1915 |
| 1,860,840 | Marsilius | May 31, 1932 |
| 2,397,086 | Brady | Mar. 26, 1946 |